US010264552B2

(12) United States Patent
Dolan

(10) Patent No.: US 10,264,552 B2
(45) Date of Patent: Apr. 16, 2019

(54) METHODS AND SYSTEMS FOR USING A MULTIMEDIA BROADCAST MULTICAST SERVICES BEARER

(71) Applicant: Alcatel-Lucent USA Inc., Murray Hill, NJ (US)

(72) Inventor: Michael F. Dolan, Bolingbrook, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 19 days.

(21) Appl. No.: 15/340,395

(22) Filed: Nov. 1, 2016

(65) Prior Publication Data

US 2018/0124742 A1 May 3, 2018

(51) Int. Cl.
H04W 72/00 (2009.01)
H04L 12/18 (2006.01)
H04W 72/12 (2009.01)

(52) U.S. Cl.
CPC ....... *H04W 72/005* (2013.01); *H04L 12/1881* (2013.01); *H04W 72/121* (2013.01)

(58) Field of Classification Search
None
See application file for complete search history.

(56) References Cited

U.S. PATENT DOCUMENTS

| 2002/0193109 | A1* | 12/2002 | Kobayashi | H04L 12/189 455/430 |
| 2003/0048806 | A1* | 3/2003 | Haartsen | H04L 29/12009 370/475 |
| 2004/0116125 | A1* | 6/2004 | Terry | H04L 12/189 455/450 |
| 2012/0170501 | A1* | 7/2012 | Drozt | H04W 72/005 370/312 |
| 2013/0294321 | A1* | 11/2013 | Wang | H04W 4/06 370/312 |

OTHER PUBLICATIONS

"3rd Generation Partnership Project; Technical Specification Group Services and System Aspects; Multimedia Broadcast/Multicast Service (MBMS); Protocols and codecs (Release 12)," 3GPP TS 26.346 V12.0.0 (Dec. 2013).
"LTE; Group Communication System Enablers for LTE (GCSE_LTE); Stage 2 (3 GPP TS 23.468 version 12.2.0 Release 12)," ETSI TS 123 468 V 12.2.0 (Sep. 2014).

* cited by examiner

*Primary Examiner* — Christine T Duong
(74) *Attorney, Agent, or Firm* — Harness, Dickey & Pierce, P.L.C.

(57) ABSTRACT

In one example embodiment, a method includes allocating resources for a common Multimedia Broadcast Multicast Services (MBMS) bearer, transmitting MBMS information to a plurality of user equipments (UEs), the MBMS information identifying the allocated resources for the common MBMS bearer, receiving a request to transmit content information using the common MBMS bearer and receiving the content information and transmitting the content information to the UEs using the common MBMS bearer

12 Claims, 4 Drawing Sheets

METHODS AND SYSTEMS FOR USING A MULTIMEDIA BROADCAST MULTICAST SERVICES BEARER

BACKGROUND

Multimedia Broadcast Multicast Services (MBMS) refers to procedures and interfaces specified for 3GPP wireless communications networks that provide point-to-multipoint connections. MBMS may be used to provide multicast and broadcast services over, for example, long term evolution (LTE) networks.

SUMMARY

Example embodiments are directed to methods and systems for using a MBMS bearer as a common broadcast channel.

Sending same content to multiple machine-to-machine (M2M) devices may be implemented using Short Message Service (SMS), which involves sending a separate message to each device. As an alternative, a cell broadcast may use a group ID to deliver the same message to multiple devices. As another alternative, a dedicated MBMS bearer may be used to send the same content to multiple devices.

The inventor has discovered that using a shared MBMS bearer that is known to all devices in a group reduces the amount of signaling that is used in SMS, cell broadcast and in a dedicated MBMS bearer. In an example embodiment, applications present their content to the MBMS system (to the BM-SC) where the request is validated, billing is done, and the content is queued for delivery over the common MBMS bearer. Thus, an MBMS bearer is used as a user plane common channel.

At least one example embodiment discloses a method including allocating resources for a common Multimedia Broadcast Multicast Services (MBMS) bearer, transmitting MBMS information to a plurality of user equipments (UEs), the MBMS information identifying the allocated resources for the common MBMS bearer, receiving a request to transmit content information using the common MBMS bearer and receiving the content information and transmitting the content information to the UEs using the common MBMS bearer.

In an example embodiment, the request to transmit includes a schedule.

In an example embodiment, the request to transmit includes a multi-transmit factor.

In an example embodiment, the method further includes segmenting the content information. The transmitting the content information transmits the segmented content information to the UEs.

In an example embodiment, the segmenting includes generating a preamble, the preamble includes segmentation information identifying a segmentation protocol.

In an example embodiment, the preamble includes address information of a sender of the content information.

In an example embodiment, the method further includes receiving requests for registration for the common MBMS bearer from the plurality of UEs.

In an example embodiment, the requests are received at a Broadcast Multicast Service Center (BM-SC).

In an example embodiment, the method further includes receiving requests to transmit application contents from a plurality of applications, respectively, scheduling transmission of the application contents on the common MBMS bearer and transmitting the application contents on the common MBMS bearer based on the scheduling.

At least one example embodiment discloses a system including at least one processor configured to execute computer-readable instructions to allocate resources for a common. Multimedia. Broadcast Multicast Services (MBMS) bearer, transmit MBMS information to a plurality of user equipments (UEs), the MBMS information identifying the allocated resources for the common MBMS bearer, receive a request to transmit content information using the common MBMS bearer and receive the content information, and transmit the content information to the UEs using the common MBMS bearer.

In an example embodiment, the at least one processor is configured to execute the computer-readable instructions to segment the content information and transmit the segmented content information to the UEs.

In an example embodiment, the at least one processor is configured to execute the computer-readable instructions to generate a preamble, the preamble includes segmentation information identifying a segmentation protocol.

In an example embodiment, the at least one processor is configured to execute the computer-readable instructions to receive requests for registration for the common MBMS bearer from the plurality of UEs.

In an example embodiment, the at least one processor is configured to execute the computer-readable instructions to receive requests to transmit contents from a plurality of applications, respectively, schedule transmission of the contents on the common MBMS bearer and transmit the contents on the common MBMS bearer according to the scheduled transmission.

BRIEF DESCRIPTION OF THE DRAWINGS

Example embodiments will be more clearly understood from the following detailed description taken in conjunction with the accompanying drawings.

FIG. 1 illustrates a communication system according to an example embodiment;

FIG. 2 illustrates a network element according to an example embodiment;

FIG. 3 illustrates a method of using a MBMS bearer as a common broadcast channel according to an example embodiment; and FIG. 4 illustrates a method of using a MBMS bearer as a common broadcast channel according to an example embodiment.

DETAILED DESCRIPTION

Figure 1:
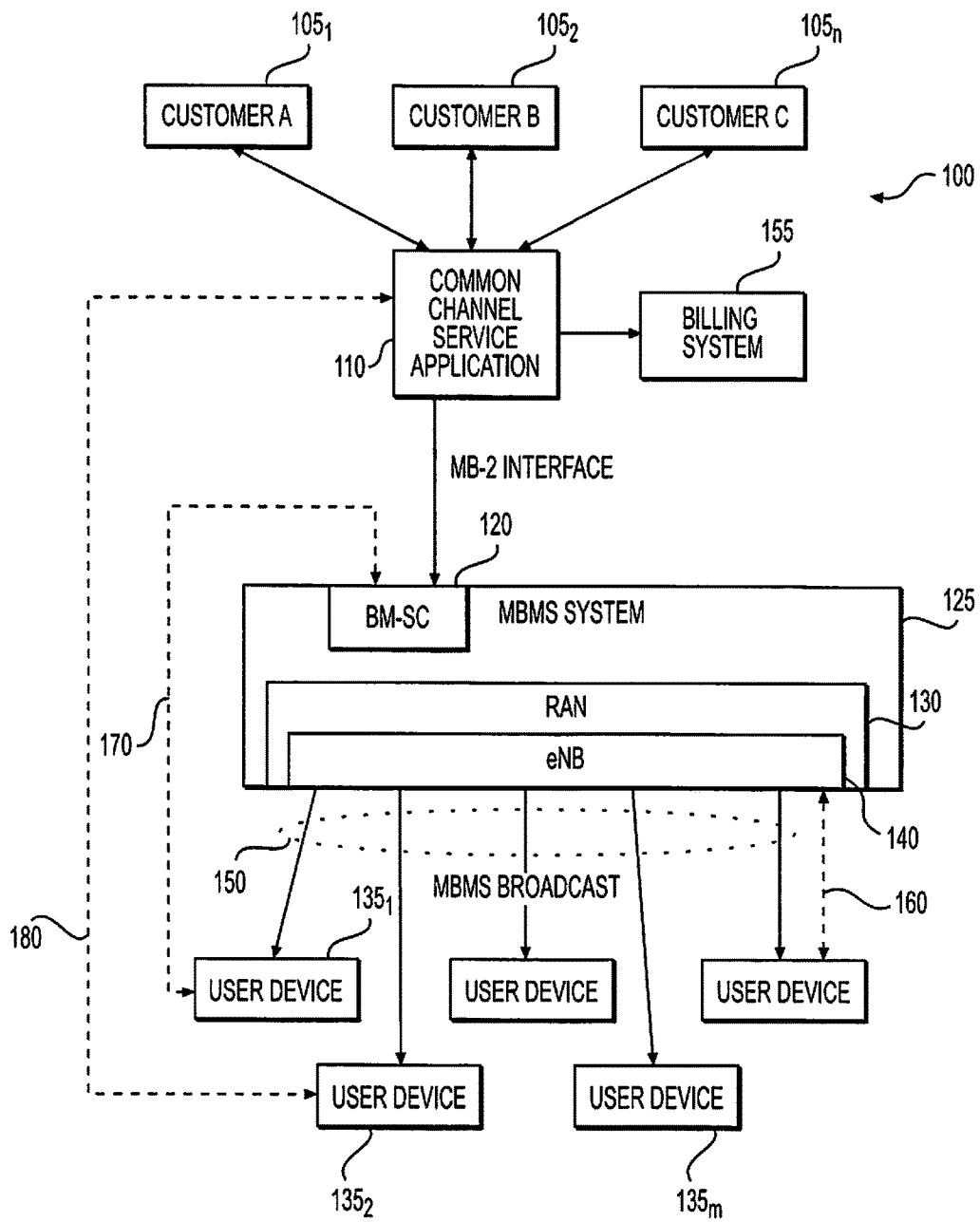
FIGS. 1-4 represent non-limiting, example embodiments as described herein.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DST's), system on chip (SoC), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of storage medium. As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

As used herein, the term "eNodeB" or "eNB" may be considered synonymous to, and may hereafter be occasionally referred to as a NodeB, base station, transceiver station, base transceiver station (BTS), macro cell, etc., and describes a transceiver in communication with and providing wireless resources to users in a geographical coverage area. As discussed herein, eNBs may have all functionally associated with conventional, well-known base stations in addition to the capability and functionality discussed herein.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network) and/or a WiFi network or WLAN.

FIG. 1 illustrates a communication system, according to an example embodiment.

FIG. 1 is a diagram of a wireless communications network 100 that uses a Multimedia Broadcast Multicast Services (MBMS) bearer as a common broadcast channel according to at least one example embodiment. A common broadcast channel is a set of radio resources that contains information (both user data and signaling) that is received by multiple devices. The wireless communications network 100 may implement, for example, the long term evolution (LTE) wireless communications standard.

MBMS is a multicast interface designed to provide broadcast services for users within a cell coverage area and for a core network. MBMS defines bearer properties and communication session characteristics based on service level requirements and radio network configurations. Bearer properties are a set of network configurations that provide special treatment to certain types of data streams, such that some types of data streams are prioritized over other types of data streams.

Bearer properties may include a minimum guaranteed bit rate (GBR), a maximum bit rate (MBR), a quality of service (QoS) class identifier (QCI), an allocation and retention priority (ARP), and other like properties. The GBR defines a minimum amount of bandwidth that is reserved by the network for a multicast stream. GBR bearers are typically used for real-time services, such as video and voice streams. The MBR is defined as the maximum allowed non-GBR throughput that may be allocated to a stream. The QCI is a value that is assigned to each data stream, which denotes a set of transport characteristics for a data stream and is used to prioritize data streams based on a level of QoS required by the data stream.

Referring to FIG. 1, the wireless communications network 100 may include a plurality of customers $105_1$-$105_n$, a Common Channel Service Application 110, a billing system 115, a broadband/multicast-service center (BM-SC) 120, a Multimedia Broadcast/Multicast Services gateway (system) 125 and a radio access network 130 (RAN) (e.g., Evolved Universal Mobile Telecommunications System (UMTS) Terrestrial Radio Access Network (EUTRAN)). The BM-SC 120 is an integral part of the MBMS system 125. The Common Channel Service Application 110 and the BM-SC 120 may communicate in accordance with 3GPP TS 26.346, version 12.0.0, the entire contents of which are hereby incorporated by reference. For example, the BM-SC 120 may be connected to a Common Channel Service Application 110 via an MB-2 interface.

The Common Channel Service Application 110 provides a means for customers $105_1$-$105_n$ to interact with it via one or more interfaces that may be standardized or proprietary. The Common Channel Service Application 110 can accept content to be transmitted on a common MBMS bearer, report the results of such transmission requests, and indicate billing and charging information, as indicated by the operator of the MBMS system 125. An interface to the billing system 115 may be proprietary or may follow standard specifications that are known. The functions provided by the Common Channel Service Application 110 include at least the ability to accept content for delivery on a common MBMS bearer and the ability to schedule such content transmission with the BM-SC 120. The Common Channel Service Application 110 may supply other functionality.

The RAN 130 may include multi-cell/multicast coordination entities (MCEs) and evolved Node Bs (eNBs) 140. Each of the eNBs 140 provides wireless access for user equipment (UEs) attached to the wireless communications network 100 including, for example, UEs $135_1$-$135_m$. The eNB 140 functions as part of the MBMS system 125, since the eNB 140 schedules the MBMS transmissions it sends.

While not shown, the RAN 130 also includes a serving gateway (SGW), a packet data network (PDN) gateway (PGW), a mobility management entity (MME) (not shown) and other RAN elements.

As shown in FIG. 1, the MBMS system 125 is configured to transmit an MBMS broadcast to the UEs $135_1$-$135_m$ using a common broadcast channel 150. The common broadcast channel 150 is broadcasted by the eNB 140 to the UEs $135_1$-$135_m$.

The UEs $135_1$-$135_m$ may acquire an identity of the common broadcast channel 150 using a communication link 160 with the eNB 140, a communication link 170 with the BM-SC 120 or a communication link 180 with the Common Channel Service Application 110. For the sake of convenience, communication links 170 and 180 are illustrated as direct communication links. However, it should be understood that the communication links 170 and 180 are IP connections from one application to another. The communication links 170 and 180 are handled by (anal pass through) the RAN 130, the SGW and the PGW.

The communication link 170 is established through the use of an address that can be downloaded to the UE 135 and sent by the BM-SC 120, as described in in section 9 of 3GPP specification TS 26.346, version 12, the entire contents of which are hereby incorporated by reference.

For example, the UEs $135_1$-$135_m$ have the ability to access the BM-SC 120 to get information on the common MBMS bearer when one of the UEs $135_1$-$135_m$ executes an application associated with the common broadcast channel. In this example, the executed application has provisioned in it an address or URL of the BM-SC 120 and creates a connection 170 to the BM-SC 120 to obtain information on the common broadcast channel 150.

Figure 2:
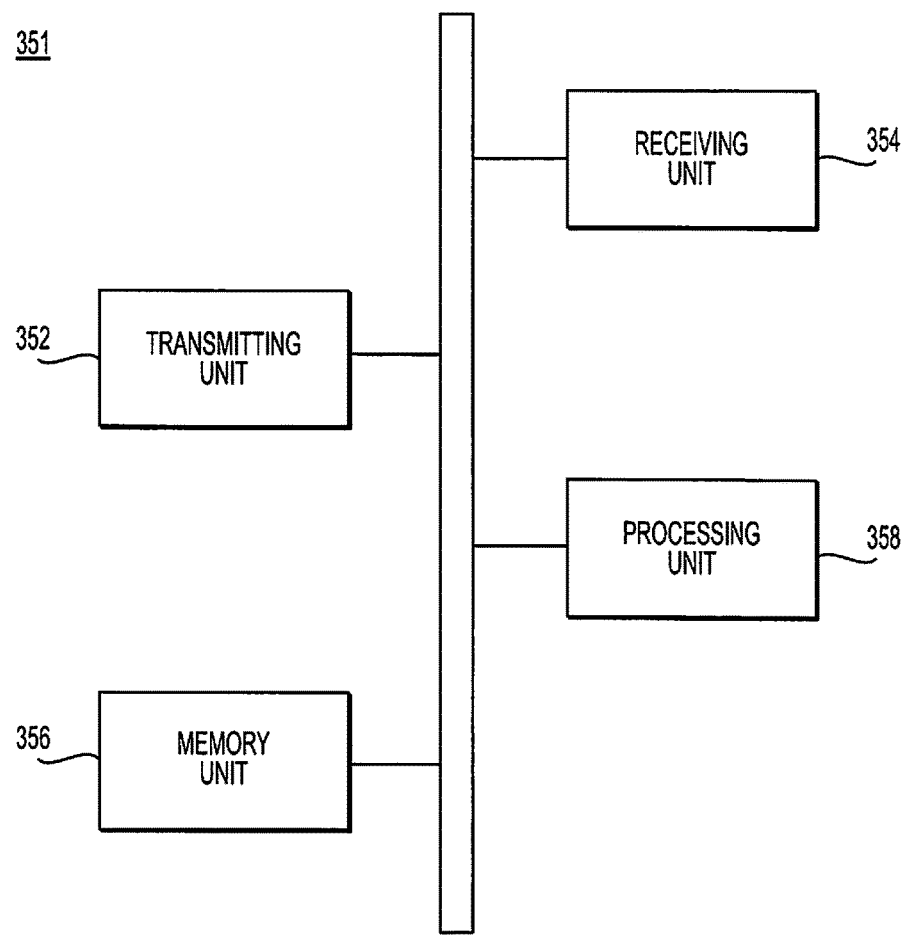

FIG. 2 is a diagram illustrating an example structure of the network element 351. Any network element described herein may have the structure and operation of the network element 351 described below. For example, any one of the Common Channel Service Application 110, billing system 115, BM-SC 120, the MBMS system 125 and the eNBs 140 may have the structure and operation of the network element 351 described below. Further, the UEs $135_1$-$135_m$ may each have the structure an operation of the network element 351. Referring to FIG. 2, the network element 351 may include, for example, a data bus 359, a transmitting unit 353, a receiving unit 354, a memory unit 356, and a processing unit 358.

The transmitting unit 353, receiving unit 354, memory unit 356, and processing unit 358 may send data to and/or receive data from one another using the data bus 359. While the transmitting unit 353 and the receiving unit 354 are illustrated as separate entities, it should be understood that the transmitting unit 353 and the receiving unit 354 may be combined to form a transceiver.

The transmitting unit 353 is a device that includes hardware and any necessary software for transmitting signals including, for example, control signals or data signals via one or more wired and/or wireless connections to other network element.

The receiving unit 354 is a device that includes hardware and any necessary software for receiving wireless signals including, for example, control signals or data signals via one or more wired and/or wireless connections to other network elements.

The memory unit 356 may be any device capable of storing data including magnetic storage, flash storage, etc.

The processing unit 358 may be any device capable of processing data including, for example, a processor structurally configured to carry out specific operations, or structurally configured to execute instructions included in computer readable code including, for example, code stored in the memory unit 356. Examples of the above-referenced processor include, but are not limited to, a microprocessor, a multiprocessor, a central processing unit (CPU), a digital signal processor (DSP), system-on-chip (SoC) devices, an application-specific integrated circuit (ASIC), and a field programmable gate array (FPGA).

According to at least one example embodiment, any operations described herein, for example with reference to any of FIGS. 1-4, as being performed by a network element (including, for example, any of the BM-SC 120, the MBMS system 125 and the eNBs 140), may be performed by a network element having the structure of the network element 351 illustrated in FIG. 2. For example, according to at least one example embodiment, the network element 351 may be programmed, in terms of software and/or hardware, to perform any or all of the functions described herein as being performed by a network element.

Examples of the network element 351 being programmed, in terms of software, to perform any or all of the functions described herein as being performed by a network element will now be discussed below. For example, the memory unit 356 may store a program including executable instructions corresponding to any or all of the operations described with reference to FIGS. 1-4 as being performed by a network element. According to at least one example embodiment, additionally or alternatively to being stored in the memory unit 356, the executable instructions may be stored in a computer-readable medium including, for example, an optical disc, flash drive, SD card, etc., and the network element 351 may include hardware for reading data stored on the computer readable-medium. Further, the processing unit 358 may be a processor configured to perform any or all of the operations described with reference to FIGS. 1-4 as being performed by a network element, for example, by reading and executing the executable instructions stored in at least one of the memory unit 356 and a computer readable storage medium loaded into hardware included in the network element 351 for reading computer-readable mediums.

Examples of the network element 351 being programmed, in terms of hardware, to perform any or all of the functions described herein as being performed by a network element will now be discussed below. Additionally or alternatively to executable instructions corresponding to the functions described with reference to FIGS. 1-4 as being performed by a network element being stored in a memory unit or a computer-readable medium as is discussed above, the processing unit 358 may include a circuit that has a structural design dedicated to performing any or all of the operations described with reference to FIGS. 1-4 as being performed by a network element. For example, the above-referenced circuit included in the processing unit 358 may be a FPGA or ASIC physically programmed to perform any or all of the operations described with reference to FIGS. 1-4 as being performed by a network element.

Figure 3:
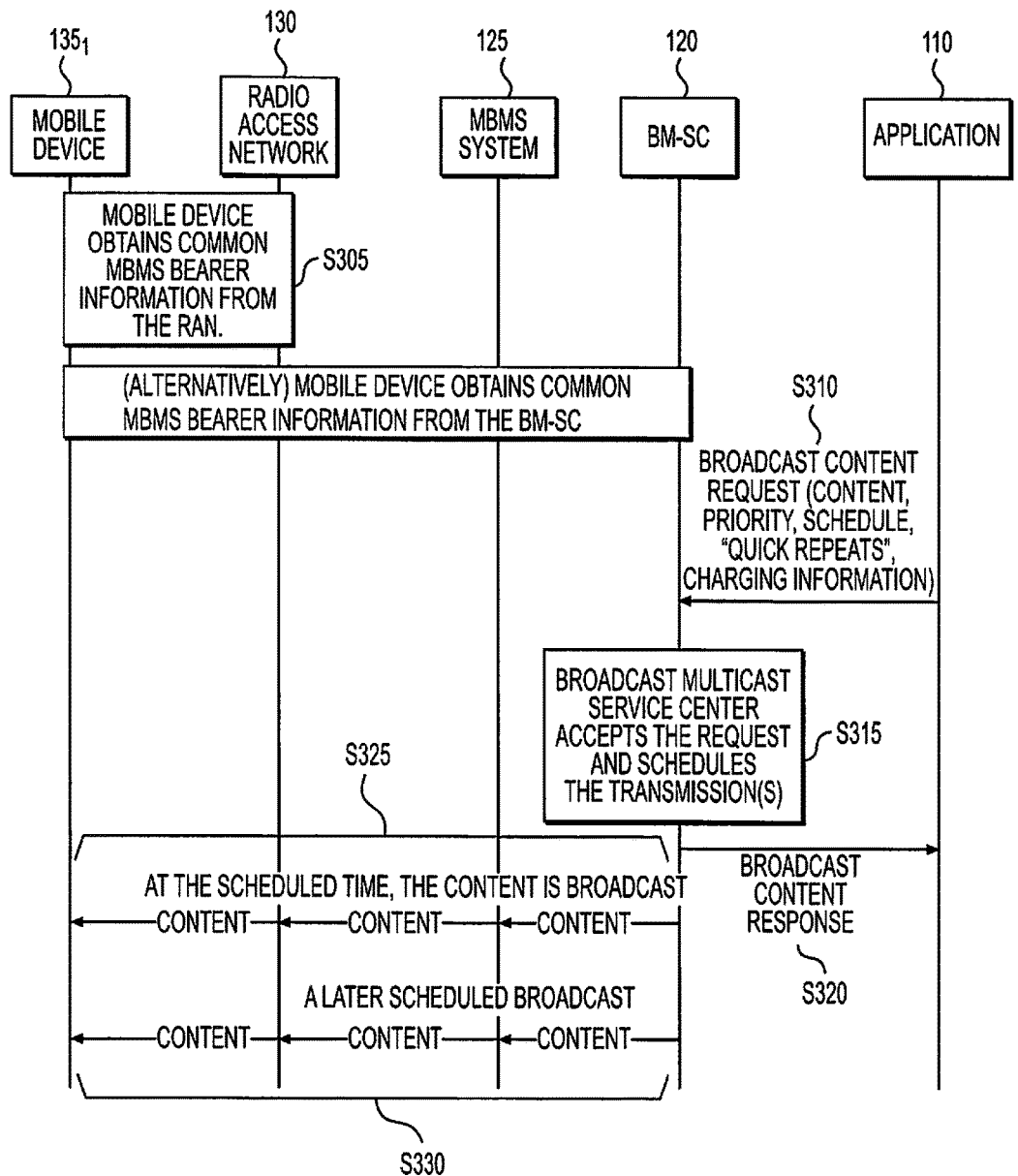

FIG. 3 illustrates a method of using a MBMS bearer as a common broadcast channel according to an example embodiment.

While FIG. 3 illustrates the mobile device 135$_1$, it should be understood that the process in FIG. 3 is used by all the UEs 135$_1$-135$_m$.

At S305, the UE 135$_1$ obtains the information for accessing (access information) the common MBMS bearer from the RAN 130. More specifically, all UEs that have access to the common MBMS bearer initially obtain the information for accessing the common MBMS bearer from the RAN 130.

The difference between a dedicated MBMS and a common MBMS bearer is that a dedicated MBMS bearer is used by a single application to send content related to just one purpose. The common MBMS bearer is used by a single application that makes transmission on the common MBMS bearer available to higher level application services such as those from the customers 105$_1$-105$_n$. Thus, the content of the common MBMS bearer may come from multiple sources.

The higher level application services share the common MBMS bearer and so may pay the network operator a correspondingly smaller fee, since the customers 105$_1$-105$_n$ do not have to individually support the cost of the entire MBMS bearer. Example embodiments open up the use of MBMS to multiple smaller application services, while at the same time allowing the network operator to offer MBMS service to multiple users. The impact on UEs 135$_1$-135$_m$ is reduced, since a UE monitors a single MBMS bearer for content of interest, rather than multiple bearers that may each contain content of interest.

The establishment of the common MBMS bearer is initiated by an application server (e.g., the Common Channel Service Application 110), which is usually in the operator's network and under the operator's control, although configuration of such an application outside of the operator's network is possible. The application server uses the mechanisms of the MB2 interface, as described in 3GPP TS 23.468, Version 12.2.0, to request that the BM-SC 120 create the common MBMS bearer. The entire contents of 3GPP TS 23.468, Version 12.2.0, are hereby incorporated by reference.

The Common Channel Service Application 110 uses the MBMS bearer as a common channel to multiplex content. The multiple contents come from the application services of the customers 105$_1$-105$_n$ that distribute their content over the area covered by the MBMS bearer. In an example embodiment, the Common Channel Service Application 110 may open several MBMS bearers over different regions to send the same content over the different regions. Each of the customers 105$_1$-105$_n$ that requests to put its content onto the common MBMS bearer may indicate which region it wishes to have its content broadcast in, and the Common Channel Service Application 110 owning the several common MBMS bearers will send the content on the appropriate common MBMS bearer to meet that request.

As shown in FIG. 3, the UE 135$_1$ obtains the access information by requesting the information from the RAN 130 at S305. The access information may identify a temporary mobile group identity (TMGI), a transmit frequency and the structure and encoding of data in the common MBMS bearer. The UE 135$_1$ monitors a MBMS control channel (MCCH) using the access information to watch for content being transmitted on the common MBMS bearer.

In other example embodiments, UE 135$_1$ obtains the information for accessing (access information) the common MBMS bearer by either requesting that information from the BM-SC 120 or by finding the information for accessing the common MBMS bearer in a broadcast System Information Block(s) from the eNB 140.

In another example embodiment, the UE 135$_1$ obtains the information for accessing the common MBMS bearer from the Common Channel Service Application 110. The Common Channel Service Application 110 is given the access information by the BM-SC 120 when the MBMS system 125 creates the common. MBMS bearer. The Common Channel Service Application 110 then provides the access information to the UE 135 using the communication link 180. In other words, the same information that the UE 135 would obtain from the BM-SC 120 is obtained from the Common Channel Service Application 110. The application on the UE 135 communicates with either the Common Channel Service Application 110 or the BM-SC 120 using IP communication. The application on the UE 135 is configured to know which method to use to obtain the common MBMS channel information.

In the example where the access information is received from the RAN 130, the access information is transmitted as content of a System Information Block (SIB). In the example where the information is provided by the BM-SC 120, the UE 135$_1$ will use the identity of the BM-SC 120 that is provisioned in it to communicate with the BM-SC 120 and obtain that same information.

At S310, the Common Channel Service Application 110 requests to broadcast content and sends the request to the BM-SC 120. The request may be based on a request from one of the customers 105$_1$-105$_n$. The broadcast content request may include the content, a priority associated with the request, a schedule for broadcasting the content, a multi-transmit factor and charging information. In an example embodiment, the customer provides a customer ID and password or other proof of identity to the Common Channel Service Application 110 as the charging information. In another example embodiment, the Common Channel Service Application 110 accepts credit card information.

At S310, the Common Channel Service Application 110 also sends the content with the request. In another example embodiment, the content is sent later, after the request is accepted by the Common Channel Service Application 110. The Common Channel Service Application 110 may encrypt the content, if the Common Channel Service Application 110 desires to protect that content from non-authorized devices that will be able to receive it on the common MBMS bearer. Encryption may also occur between the customers 105$_1$-105$_n$ and the Common Channel Service Application 110.

The schedule specifies one or more times that the content is to be sent and may specify specific times for transmission (e.g., begin at 12:15 and repeat every hour for a total of five transmissions).

The multi-transmit factor specifies that the content is to be included N times in the common MBMS bearer each time it is scheduled for transmission, forming a repetition factor mechanism. The multi-transmit factor may be used to assure delivery to devices that wake up at a particular time to check for content intended for that device. This allows M2M devices that wake up to listen for triggers to have multiple opportunities to acquire content while they are awake, thus improving triggering efficiency and saving battery.

At S315, the BM-SC 120 accepts the request and schedules the transmission based on the priority and the network operator's rules pursuant to an agreement regarding the common MBMS bearer. For example, the BM-SC 120 determines a queuing order based on the priority. If the content to transmit is larger than will fit in a single transmission, the BM-SC 120 may segment the content for reassembly at the UE 135$_1$, using FLUTE, DASH or another transport service available in MBMS. The BM-SC 120 can include segmentation information in a preamble to the content information about the segmentation protocol including an address of the BM-SC 120 for the UE 135$_1$ to request retransmission of blocks of the content. Such segmentation can also provide interleaving with other content, so that large content does not block higher priority content for long periods of time.

Example embodiments may use known methods for transmission of content on a particular schedule, including non-preemption once content has been scheduled for a particular time.

The BM-SC 120 inspects the request and verifies that content can be sent at the requested time and with the requested priority (if any). Once the BM-SC 120 has determined that the content can be broadcast, the BM-SC 120 acknowledges the request and schedules the content for transmission. Referring back to FIG. 3, the BM-SC 120 acknowledges receipt of the broadcast content request by sending a broadcast content response at S320.

At S325, the BM-SC 120 broadcasts the content in the broadcast content request in accordance with the scheduling performed by the BM-SC 120. The broadcast includes transmitting the content to the MBMS system 125, which then forwards the content to the RAN 130 (more specifically, the eNB 140). The eNB 140 then broadcasts the content to the UEs 135$_1$-135$_m$ that are listening for the common MBMS bearer. At S330, the BM-SC 120 may repeat the broadcast based on the multi-transmit factor provided in the broadcast content request. It is to be understood that the content may be delivered from the Common. Channel Service Application 110 to the BM-SC 120 at a time after the broadcast content response is received at the Common Channel Service Application 110 and before the scheduled broadcast time in another example embodiment.

Figure 4:
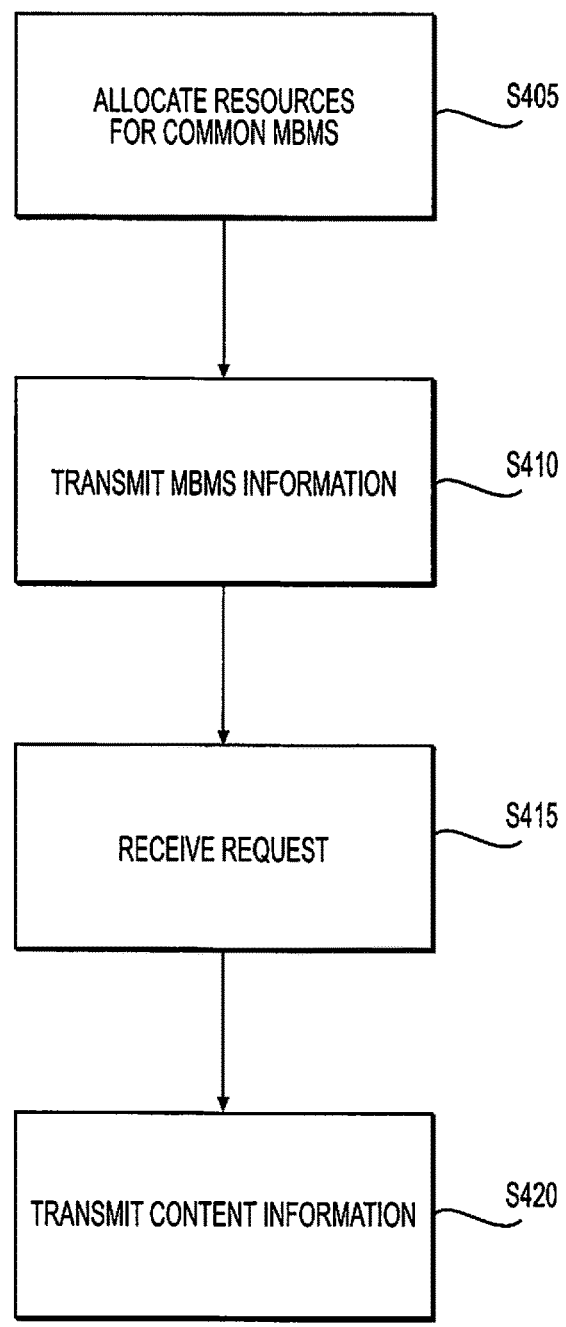

FIG. 4 illustrates a method of using a MBMS bearer as a common broadcast channel according to an example embodiment. The method of FIG. 4 may be performed by the network operator. In one embodiment, the network operator includes the MBMS system 125 and the Common Channel Service Application 110. In another embodiment, the network operator is the MBMS system 125 and the Common Channel Service Application 110 is a trusted third party of the network operator.

At S405, the MBMS system 125 allocates resources for a common MBMS bearer. For example, MBMS system 125 creates the common MBMS bearer using the mechanisms of the MB2 interface (3GPP TS 23.468).

At S410, the MBMS system 125 provides the MBMS information to a plurality of UEs via the paths 160, 170, or 180 shown in FIG. 1. For example, the UE 135$_1$ obtains the access information by requesting the information from the RAN 130 using the path 160, which is from the MBMS system 125. In another example embodiment, UE 135$_1$ obtains the information for accessing (access information) the common MBMS bearer from the BM-SC 120 using the path 170. The UE 135$_1$ monitors a MBMS control channel (MCCH) using the access information to watch for content being transmitted on the common MBMS bearer.

At S415, the MBMS system 125 receives a request to transmit content information using the common MBMS bearer. For example, the Common Channel Service Application 110 requests to broadcast content and sends the request to the BM-SC 120.

In one example embodiment, the Common Channel Service Application 110 also sends the content with the request to the BM-SC 120. In another example embodiment, the content is sent to the BM-SC 120 later after the request is accepted by the Common Channel Service Application 110.

At S420, the MBMS system 125 transmits that content to the 135$_1$-135$_m$.

As described above, example embodiments provide a method to deliver single occurrences of content once or multiple times to devices over a wide geographic area. The content can be larger than that which fits in SMS or Cell Broadcast transports. The network operator can make this service available to any application, thus opening up new revenue streams.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A method comprising:

allocating resources for a common Multimedia Broadcast Multicast Services (MBMS) bearer;

transmitting MBMS information to a plurality of user equipments (UEs), the MBMS information identifying the allocated resources for the common MBMS bearer;

receiving a request to transmit content information using the common MBMS bearer and receiving the content information;

segmenting the content information, the segmenting including generating a preamble, the preamble including segmentation information identifying a segmentation protocol and address information for requesting retransmission of segments of the segmented content information; and transmitting the content information to the UEs using the common MBMS bearer, the transmitting the content information including transmitting the segmented content information to the UEs.

2. The method of claim 1, wherein the request to transmit includes a schedule.

3. The method of claim 2, wherein the request to transmit includes a multi-transmit factor.

4. The method of claim 1, further comprising:

receiving requests for registration for the common MBMS bearer from the plurality of UEs.

5. The method of claim 4, wherein the requests are received at a Broadcast Multicast Service Center (BM-SC).

6. The method of claim 1, further comprising:

receiving requests to transmit application contents from a plurality of applications, respectively;

scheduling transmission of the application contents on the common MBMS bearer; and transmitting the application contents on the common MBMS bearer based on the scheduling.

7. A system comprising:

at least one processor configured to execute computer-readable instructions to cause the system to, allocate resources for a common Multimedia Broadcast Multicast Services (MBMS) bearer, transmit MBMS information to a plurality of user equipments (UEs), the MBMS information identifying the allocated resources for the common MBMS bearer, receive a request to transmit content information using the common MBMS bearer and receive the content information, segment the content information, the segmenting including generating a preamble, the preamble including segmentation information identifying a segmentation protocol and address information for requesting retransmission of segments of the segmented content information, and transmit the content information to the UEs using the common MBMS bearer by transmitting the segmented content information including the preamble to the UEs.

8. The system of claim 7, wherein the request to transmit includes a schedule.

9. The system of claim 8, wherein the request to transmit includes a multi-transmit factor.

10. The system of claim 7, wherein the at least one processor is configured to execute the computer-readable instructions to cause the system to, receive requests for registration for the common MBMS bearer from the plurality of UEs.

11. The system of claim 10, wherein the requests are received at a Broadcast Multicast Service Center (BM-SC).

12. The system of claim 7, wherein the at least one processor is configured to execute the computer-readable instructions to cause the system to, receive requests to transmit application contents from a plurality of applications, respectively, schedule transmission of the application contents on the common MBMS bearer, and transmit the application contents on the common MBMS bearer according to the scheduled transmission.

* * * * *